3,263,339
APPARATUS FOR TREATING SOLID PARTICLES
IN A FLUIDIZED STATE
Ernest C. Brown, Danvers, and Robert S. Temple, Concord, Mass., assignors to Wolverine Corporation, a corporation of Massachusetts
Filed Oct. 23, 1963, Ser. No. 318,261
3 Claims. (Cl. 34—57)

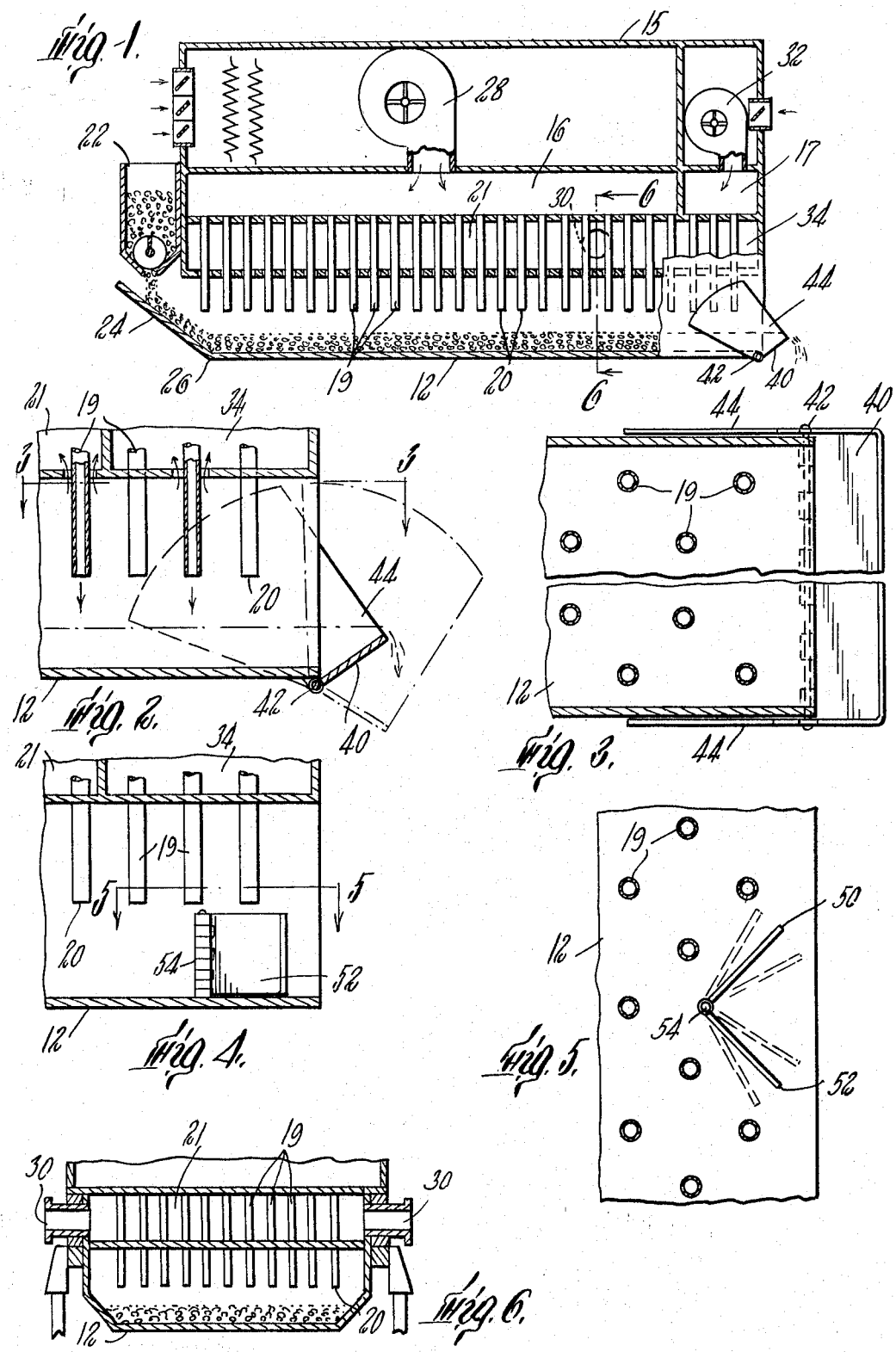

This invention relates to the treatment of solid particulate material with a gaseous medium brought into heat exchange or other treating relation therewith, and more specifically to the provision of improvements in apparatus for carrying out such treatment in a continuous as distinguished from a batch operation.

The invention deals particularly with apparatus in which the particles are fed in at one end of a generally horizontal trough and move to and drop off the exit end thereof in continuous flow while being fluidized by spaced jets of a gaseous medium directed downwardly onto the particles between the jets. Where a head of particulate material is maintained at the infeed end of the apparatus, continuous flow of the particulate material can be maintained, in the manner of a liquid, with or without conveying vibration of the underlying trough.

In a patent application filed concurrently herewith, Serial No. 318,262, there is described and claimed such an apparatus wherein the dwell of fluidized particles in a treating zone is controlled by deaerating the particles as they emerge from the treating zone to form an unfluidized bed whose advance is positively controlled by the setting of the amplitude and frequency of trough vibration.

In contrast, the present invention deals with an apparatus wherein similar results of improved capacity are obtained by interposing in the path of the advancing fluidized particles a mechanical baffle which can be adjusted to lessen the cross-sectional area of the path of the advancing fluidized bed by means other than or in addition to deaeration of the particles. The present invention is therefore adapted for use with stationary troughs wherein the advance of the fluidized bed is caused solely by a head created at the entering end of the trough, as described in Hoyt application Serial No. 202,279, filed June 13, 1962, and now pending, as well as with vibrating troughs.

Because, however, a mechanical baffle disrupts uniform advance of individual particles, it is an essential part of this invention that the mechanical baffle be located beyond the end of the treating zone and preferably at the end of a cooling zone so that the disruption of uniform flow caused by the mechanical baffle will not extend back into the treating zone. Otherwise, uniformity of thermal treatment would be adversely affected.

Apparatus embodying the principles of this invention is shown in the accompanying drawing wherein:

FIG. 1 is a cross-sectional representation of apparatus embodying one form of the invention, showing a portion thereof in elevation;

FIG. 2 is an enlarged cross-sectional detail of the portion of the apparatus shown in elevation in FIG. 1;

FIG. 3 is a cross-sectional view taken along the line 3—3 of FIG. 2, broken away to indicate extent;

FIG. 4 is a detail view, similar to that of FIG. 2, but showing a modified form of the invention;

FIG. 5 is a cross-sectional fragment taken along the line 5—5 of FIG. 4; and

FIG. 6 is a cross-sectional view taken along the line 6—6 of FIG. 1.

As shown in FIG. 1, the apparatus embodies a horizontal elongated imperforate trough 12 which is surmounted by a housing 15 which contains a hot plenum 16 and a cool plenum 17. The plenum 16 communicates with one group of spaced tubes 19 which have orifices 20 lying in a single horizontal plane parallel to the plane of the trough, whereas the cool plenum 17 communicates with the remaining group of nozzles near the exit end of the housing.

A hopper 22 is provided at the infeed end of the trough 12 for feeding particles at a metered rate as by a screw whose r.p.m. is adjustable, down onto an inclined plate 24 leading to a junction 26 with the horizontal trough beneath the first row of nozzles 19.

The portion of the trough beneath the nozzles which communicate with the hot plenum 16 constitutes a treating zone into which a fan 28 impels heated air at high velocity through the tubes 19 which direct the gaseous streams perpendicularly downwardly towards the trough 12, the gases being exhausted upwardly between the tubes 19 and outwardly through an exhaust chamber 21 from which they may be exhausted through ports 30 to atmosphere or if desired into a closed recirculating system.

Fan 32 communicating with the cool plenum 17 operates in a similar manner to supply air jets into the exit zone chamber with these gases being exhausted up through an exhaust chamber 34 for exhaust to the atmosphere or recirculation.

In the form shown in FIGS. 1, 2 and 3 a plate 40 is hinged at 42 to the end of the trough 12 and has side plates 44 extending along the outside of the housing so that the plate may by suitable means be fixed in any of a number of adjustable inclined positions.

If, for example, the plate 40 is in the position shown in full lines in FIGS. 1 and 2, it acts as a mechanical baffle against which the particles advancing in the form of a bed along the trough 12 move. Because of the resistance provided by the inclination of the plate 40 there is some slowing down of flow of individual particles which tend to become trapped or otherwise hindered from their normal uniform flow by the resistance. However, because the hot treatment has ceased before the particles enter into the exit zone which is supplied with cool, not hot, air, any added or unequal dwell of individual particles in the cool exit zone does not affect their uniformity of of treatment as imparted during their uniform passage through, and uniform dwell in, the hot treating zone.

The effect of the plate 40 is that the depth of the fluidized bed may be increased over that obtainable were the mechanical baffle not present, thus enlarging the capacity of the machine without lessening the dwell time of the particles in the treating zone. As the rate of feed is increased, the plate may be adjusted upwardly so that the increased rate of feed does not change the linear advance of the particles through the treating chamber but merely increases the number of particles per square foot in the treating chamber at any one instant because of the increase in depth provided by the adjustment of the plate 40.

Similar results are achieved by mounting a pair of plates 50 and 52 (FIGS. 4 and 5) for pivotal butterfly opposed motion about a vertical axis 54 to adjusted positions. With this form of baffle, the path of advancing particles is restricted in cross-sectional area horizontally rather than vertically as shown in FIG. 1 but the results are the same, namely, that, as the cross-sectional area is lessened, the depth of the advancing bed in the treating chamber will be increased.

As can be seen, the apparatus can be operated by utilizing as the advancing force either the mere creation of a head at the input end of the machine or vibrational motion of the trough 12, including the baffles, in a known manner.

The apparatus is useful in the food industry for roasting, drying or cooling materials such as nuts, cocoa beans, coffee beans, grains, cereals, dehydrating vegetables, for example, peas and beans, and for conditioning plastic particles, rubber particles, etc., for industrial purposes.

What is claimed is:

1. Apparatus for thermally treating particles as they advance continuously, comprising a substantially horizontal elongated trough, means for feeding particles continuously and at a constant rate into one end of said trough, a series of nozzles arranged to project gaseous streams perpendicularly downwardly into said trough to fluidize said particles in said trough, means for exhausting said gases upwardly away from said trough between said nozzles, a plenum for hot air communicating with one group of said nozzles located in a treating zone in advance of an exit zone, a separate plenum for cooler air communicating with the nozzles in said exit zone, and baffle means extending upwardly from the plane of said trough adjacent the exit end of said exit zone and reducing the cross-sectional area of the path of advance of said particles as they emerge from said exit zone.

2. Apparatus as claimed in claim 1, wherein said baffle means comprises a plate hinged for pivotal movement about a horizontal axis into an adjusted inclined position with respect to the plane of said trough.

3. Apparatus as claimed in claim 1, wherein said baffle means comprises a pair of plates hinged for opposed pivotal movement about a common vertical axis located transversely medially of said trough.

References Cited by the Examiner
UNITED STATES PATENTS

| 2,044,744 | 6/1936 | Hansen | 34—10 X |
| 2,371,619 | 3/1945 | Hartley | 34—57 X |
| 2,513,369 | 7/1950 | Shaw | 34—57 X |

WILLIAM F. O'DEA, *Primary Examiner.*

D. A. TAMBURRO, *Assistant Examiner.*